United States Patent
Ferrono et al.

(10) Patent No.: US 7,418,832 B2
(45) Date of Patent: Sep. 2, 2008

(54) PORTABLE MISTER FOR ADJUSTING AMBIENT TEMPERATURE

(76) Inventors: William R Ferrono, 12208 Thunderbird Rd., Phoenix, AZ (US) 85351; Ginger Reed, 12208 Thunderbird Rd., Phoenix, AZ (US) 85351

( * ) Notice: Subject to any disclaimer, the term of this patent is extended or adjusted under 35 U.S.C. 154(b) by 467 days.

(21) Appl. No.: 10/904,073

(22) Filed: Oct. 21, 2004

(65) Prior Publication Data

US 2005/0082390 A1    Apr. 21, 2005

Related U.S. Application Data

(60) Provisional application No. 60/481,536, filed on Oct. 21, 2003.

(51) Int. Cl.
  *F25D 3/08* (2006.01)
(52) U.S. Cl. .................. 62/372; 62/259.4
(58) Field of Classification Search .......... 239/289, 239/304, 332, 373, 418, 547, 550, 556, 71, 239/72; 62/342, 372, 74, 259.4
See application file for complete search history.

(56) References Cited

U.S. PATENT DOCUMENTS

| | | | |
|---|---|---|---|
| 5,035,260 A | 7/1991 | Davey | |
| 5,330,104 A | 7/1994 | Marcus | |
| 5,337,960 A | 8/1994 | Allen | |
| 5,373,703 A | 12/1994 | Pal | |
| 5,497,633 A | 3/1996 | Jones et al. | |
| 5,553,780 A * | 9/1996 | Gjerde | 239/71 |
| 5,595,209 A | 1/1997 | Atkinson et al. | |
| 5,613,371 A | 3/1997 | Nelson | |
| 5,676,283 A | 10/1997 | Wang | |
| 5,902,042 A | 5/1999 | Imaizumi et al. | |
| 5,961,048 A * | 10/1999 | Prieschl et al. | 239/146 |
| 5,979,793 A * | 11/1999 | Louis | 239/128 |
| 6,103,128 A | 8/2000 | Koso et al. | |
| 6,151,907 A | 11/2000 | Hale | |
| 6,156,159 A | 12/2000 | Ekholm et al. | |
| 6,158,669 A * | 12/2000 | Louis | 239/146 |
| 6,186,168 B1 | 2/2001 | Schultz et al. | |
| 6,216,966 B1 | 4/2001 | Prendergast et al. | |
| 6,257,502 B1 | 7/2001 | Hanish et al. | |
| 6,296,151 B1 | 10/2001 | Chen | |
| 6,305,580 B1 | 10/2001 | Chen | |
| 6,398,132 B1 | 6/2002 | Junkel et al. | |
| 6,598,803 B1 | 7/2003 | Haas et al. | |
| 6,786,701 B1 * | 9/2004 | Huang et al. | 417/199.1 |
| 7,188,783 B2 * | 3/2007 | Ivey et al. | 239/136 |
| 2002/0020761 A1 * | 2/2002 | Jordan | 239/310 |

* cited by examiner

*Primary Examiner*—Melvin Jones
(74) *Attorney, Agent, or Firm*—Snell & Wilmer, LLP (57) ABSTRACT

A portable mister for cooling ambient air is disclosed comprising a housing for entirely containing a cooling agent, an irrigation system connected to the housing for receiving the cooling agent from the housing and dispersing the cooling agent in ambient air, and a pump for facilitating the transfer of the cooling agent to the irrigation system. The mister is portable in that the cooling agent is entirely enclosed in a portable housing. That is, the mister user need not connect the mister to a continuous cooling agent source for operation. Additionally, the irrigation system is configured for placement to cool the ambient air of a broad area. The housing may include a system for including a fragrance in the cooling agent. The fragrance including system facilitates added a pleasant aroma to the dispersed cooling agent.

14 Claims, 8 Drawing Sheets

PORTABLE MISTER FOR ADJUSTING AMBIENT TEMPERATURE

CROSS-REFERENCE TO RELATED APPLICATIONS

This application claims priority to U.S. Provisional Application No. 60/481,536, titled "Portable Mister for Adjusting Ambient Temperature," filed Oct. 21, 2003.

FIELD OF INVENTION

The present invention relates to a portable mister for adjusting the ambient temperature of an environment.

BACKGROUND OF INVENTION

Recent years have seen an increase in worldwide global temperatures. The result of the increasing global temperatures is that many places and people around the world experience uncomfortably hot seasonal temperatures especially during the summer months. Finding respite from the uncomfortable temperatures often means staying indoors and being blanketed by the cooling affects of air-conditioned air. For those forced to venture outdoors, "air conditioning" is not typically available. Some relief from the uncomfortable outside temperatures can be obtained by finding a shaded area not in direct sunlight. However, in some cases, even shaded areas do not provide sufficient cooling, especially if, for example, the temperature in the shade is 100° F. or higher. As such, much effort and resources are being focused on developing techniques for cooling persons who are forced to endure uncomfortably hot seasonal temperatures when outdoors.

One such technique provides cooling by exploring the cooling properties of evaporating mist. Cooling occurs when mist droplets impinge upon a target and are evaporated into the surrounding air. Additional cooling takes place if the liquid itself is very cold relative to the surrounding air. Further, an object or observer may be additionally cooled if an air stream transports the liquid to an observer, and the air stream blows on the user so as to accelerate the evaporation process.

The evaporative temperature change results from the process whereby droplets of the liquid extract heat energy from the air and use the energy to change the phase of the droplet from liquid to vapor. Thus the temperature change is achieved without the introduction of external refrigeration power, unlike cooling systems which extract heat from the refrigeration system component(s). In contrast, when a droplet evaporates, the latent heat energy expended in vaporization is drawn from the warm air, which accounts for the temperature drop.

It is well known that with a given mixture of the air and water, the temperature achieved by evaporative cooling varies with the initial dryness of the ambient air. For example, given dry warm air at 95° F. (35° C.) and 20 percent relative humidity, atomizing ambient temperature water therein can drop the temperature of the mixture to as low as 66° F. (19° C.). Similarly, if the same ambient air at 95° F. has a relative humidity of 50 percent, then atomizing the water reduces the temperature of the mixture to about 80° F. (27° C.). As should be easily understood, atomizing a cooled water source into ambient air reduces the temperature of the resulting air-water mixture even further. Where tap water from the domestic supply is used as a water source, the tap water will be relatively cool after flowing for a time. As such, many inventions, which use atomized water as a cooling source, make use of ordinary tap water as a cooling agent. The prior art systems, however, contain various deficiencies, in that the systems are often too inconvenient or not fully portable, as described below.

With the above in mind, many prior art systems incorporate a fine mist or spray as the primary cooling agent. For example, one conventional method for providing a mist or spray for cooling is disclosed in U.S. Pat. No. 6,398,132, issued Jun. 4, 2002, to Junkel. The Junkel patent generally discloses a portable spray misting device, which is fully handheld when operated. The device includes an internally hollowed body capable of holding a volume of fluid to be dispensed. The liquid is dispensed when a user manually pulls a trigger disposed alongside the hollowed body, which causes the liquid to be drawn toward a spray dispensing head for projecting the liquid as a mist into fan blades of a fan unit. The fan unit, in turn, dispenses the mist into the atmosphere, and onto a user, thereby cooling the user through mist evaporative principles.

The invention of the Junkel patent is suitable for users who wish to achieve personal cooling, since it ordinarily may be used by only one user at a time using one hand. However, the Junkel invention is deficient in that users must operate the invention manually, typically leaving only one hand to perform everyday tasks. That is, since the Junkel invention requires the use of at least one user hand to operate, the user of the Junkel invention will be limited in the activities the user may perform while staying cool. Thus, an invention is needed which cools a user without user assistance or user manipulation, thereby freeing the user to perform various other activities.

A typical invention, which cools a user without user assistance, is disclosed, for example, in U.S. Pat. No. 5,613,371, issued Mar. 25, 1997, to Nelson. The Nelson patent generally discloses a method and apparatus for misting vehicle occupants by providing a fine spray of water into the air inside and surrounding the vehicle. In accordance with Nelson, a pumping system forces water from a water reservoir on board the vehicle through mister nozzles. When attached to a vehicle, the Nelson invention cools the vehicle occupants while permitting the occupants to perform other activities. For example, where the Nelson invention is affixed to a golf cart, the occupants are cooled when being transported from golf stroke to golf stroke.

Similar systems are disclosed for example, in U.S. Pat. No. 5,373,703, issued Dec. 20, 1994, to Pal, and U.S. Pat. No. 6,151,907, issued Nov. 28, 2000, to Hale. The aforementioned Nelson, Pal, and Hale systems are sufficient for cooling a vehicle occupant while the occupant is seated therein. However, the systems are not suitable for cooling the occupant when the occupant exits the vehicle, such as, for example, when the user must leave the vehicle to engage in an outside activity. For example, where a user installs the aforementioned system on a golf cart while golfing, the user must typically exit the vehicle to advance the ball down the course. As such, the Nelson, Pal and Hale systems are not suitable for cooling persons situated on the outside of a vehicle.

One method for cooling a user outside a vehicle is disclosed in U.S. Pat. No. 5,330,104, issued Jul. 19, 1994, to Marcus. The Marcus patent generally discloses a self-contained portable mister which may mist an outdoors environment without assistance or intervention from a user. The portable misting apparatus includes a self-priming pump disposed inside a soundproof housing. The housing may include an operable lid and pivotable carrying handle. The invention further includes a rechargeable battery for powering the pump and a solar cell array disposed in the operable lid for recharging the battery. Liquid is supplied to the invention by drawing the liquid from a reservoir, such as a lake, stream, pond, swimming pool, ice chest, bucket, or the like, which is remote to the location of the invention housing. Alternatively, the invention may be adapted to provide the liquid from a pressure source of water. The pump further provides the liquid to a misting wand, which conveys the liquid to a plurality of misting nozzles. The housing of the Marcus invention further includes a cavity suitable for storage of a misting wand, when the invention is not in use.

One problem with the Marcus invention, however, is that a solar cell battery powers the invention. It is well known that solar cell batteries need the advent of light (e.g., sunlight or direct sunlight) for recharging and for continuous operation. Thus, the Marcus invention would necessarily have limited use when used in shaded environments or environments where light is limited. As such, a need exists for a mister system which can be used irrespective of whether the system is placed in direct light, or in a shaded area.

In addition, as a source for providing the cooling liquid, the Marcus invention uses a reservoir, such as a lake, stream, pond, swimming pool, ice chest, bucket, or the like, located remote to, and in communication with, the invention housing. To operate the Marcus invention, a user must provide the cooling liquid to the invention by, for example, locating the invention near a source of water (e.g., lake, stream, etc.) or to bringing the water to the invention (e.g., ice chest, bucket, etc.). As such, for example, the Marcus invention is limited in its portability, in that the user must determine the location of the liquid supply when deciding the location of invention usage, and the user may ordinarily have to supply the liquid supply in the form of a reservoir positioned externally to the invention housing. Therefore, a need exists for a more portable misting system, such as, a misting system which permits usage without requiring the user to supply an externally positioned cooling liquid source.

U.S. Pat. No. 6,257,502, issued Jul. 10, 2001, to Hanish, et al., is a conventional example of a system which cools a user without user assistance, and which does not require the user to transport a cooling source to the system. In accordance with Hanish, an integrated multi-head misting device is provided which is removably attached to a household faucet or garden hose for receiving a cooling liquid. A misting fan is provided which includes a fan shroud including a grille and fan blades for permitting an air stream therethrough, where the air stream results from fan blade operation. A misting device is secured to the fan hub, and a plurality of misting heads are secured to the fan housing for directing a spray of mist across a fan grille. When the mist is projected into the air stream, the blowing action of the fan blades directs the mist away from the device and into the direction of an invention user.

Power is supplied to the Hanish fan via a typical outlet, and the mist is provided via a pressurized source. The mist is injected across the fan grille via a misting manifold which directs the liquid through the misting heads. That is, no pump, or electricity of powering the pump, is required for providing the cooling liquid to the misting heads. More particularly, no solar powered batter is required as with, for example, the Marcus patent noted above. In that regard, the Hanish invention provides advantages over the Marcus invention in that the Hanish invention is not dependent on direct light for operation, but instead may be operated in a relatively shaded area.

The cooling liquid is supplied to the Hanish invention by connecting the invention to a pressurized water supply, such as, a faucet or garden hose. Consequently, the Hanish invention still includes a similar disadvantage as Marcus, in that the invention must be operated near, or connected to, a cooling liquid source. As such, the Hanish invention, like the Marcus invention, does not provide a totally portable mister device.

The Hanish invention includes the additional disadvantage in that the area of airflow created by the Hanish fan blades limits the area of dispersion of the cooling mist. Thus, where the fan blades blow air to a maximum area in front of the fan, the cooling liquid, which is transported by the air stream, will only travel over that area. Further, unless the Hanish invention is positioned above a user, such that the mist droplets may settle on the user, the user would necessarily need to be directly in the air stream flow in order to be properly cooled. Further still, when used with conventional household fans, the Hanish invention is typically suitable for cooling only a limited number of people at any one time.

Another conventional misting device of similar operation as Hanish, is disclosed in U.S. Pat. No. 5,497,633, issued Mar. 12, 1996, to Hensley. The Hensley patent generally discloses an indoor/outdoor evaporative cooling unit which is inflatable via flexible walls. The flexible walls form a partially sealed enclosure for making the invention more portable when deflated. The cooling unit includes an inner wall and an outer wall of thin flexible material. A fan forces ambient air from an inlet through a flow divider, which directs some of the flow into the enclosure and the remainder of the flow into a chamber to exhaust through a chamber outlet. Spray nozzles are attached to the enclosure and aimed to spray a coolant, such as water, into the air exhausting through the outlet.

In essence, the Hensley invention operates by drawing in a steady flow of ambient air through an intake, and exhausting the drawn air through a ring of nozzles spraying a coolant into the exhaust stream. The coolant (e.g., water) is supplied to the invention via a pressurized water source or by suitable flexible flow connections and a pump. In one embodiment, the combination of the chamber design and the positioning of the spray nozzles permits the Hensley mister to spray a mist at the chambers outlet, which is modestly sized for permitting service of multiple users on, for example, a walk-by basis. That is, one embodiment of the Hensley invention is similar to the Hanish invention in that it is only suitable for cooling only a limited number of people at any one time. In an alternate embodiment, however, the Hensley invention may be adapted for use in simultaneously cooling multiple persons by including multiple outlet pairs in the chamber and arranging the spray nozzles such that the nozzles are mounted in a middle of an outlet pair. This, in turn, permits the Hensley invention to create a billowing stream or cloud with a greater effective cooling range than a typical mist or stream.

Although the Hensley invention provides for the production of a cooling cloud for cooling multiple users, the users must typically walk through or under the point of discharge of the coolant to be cooled down. In that regard, the Hensley invention, while providing a means for cooling multiple users, does not cool the users simultaneously.

Accordingly, a need exists for a mister for cooling multiple users simultaneously, which is completely portable, does not require user assistance for operation, and which may be used in any light.

SUMMARY OF INVENTION

The present application discloses a portable mister for use in lowering ambient temperature of an environment indoors or outdoors. In one aspect, the present invention lowers ambient temperature by providing a mist of droplet size moisture to the atmosphere, wherein the droplets include a temperature less than or equal to ambient temperature of the atmosphere. The droplets size, rate of distribution and distribution area maybe adjusted as desired. The droplets may be provided to the atmosphere such that the droplets may travel on air currents and descend toward the earth's surface due to the effects of air currents and gravity. The evaporative properties of the droplets cool the surface on which the droplets come to rest.

In another aspect of the invention, the present invention operates to cool surrounding articles, people and other similar objects on which the droplets settle by providing added moisture to the surface of those objects. The moisture may then cool the article by lowering the article's temperature relative to the droplet temperature and via the droplet's evaporative properties. Moisture may be provided to the atmosphere at any location and over any desired area for cooling multiple users by proper placement of the droplet delivery means.

In yet another aspect of the invention, the droplet size or rate of dispersion may be controlled either manually or automatically, to provide more or less of the droplets to the atmosphere. For example, the size of the individual droplets and the rate of dispersion may be increased when it is desired to disperse a greater quantity of droplets in a shorter period of time. Where increasing droplet size but conserving the overall quantity of droplets dispersed is a concern, then the droplet size may be increased, but the rate of dispersion may be decreased. Similarly, where it is desired to, for example, increase the quantity of individual droplets, but to decrease the overall quantity of droplets dispersed, the size and dispersion rates of the droplets may be decreased.

In yet another aspect of the present invention, a portable mister is provided which is more convenient to use than the prior art. First, the mister of the present invention is fully portable in that the invention does not require the user to separately transport a cooling agent (e.g., water) for misting. That is, the cooling agent may be entirely contained within the invention housing, thereby eliminating the need to supply a hose, reservoir, bucket, or the like, including the agent. Second, the mister includes an irrigation system for providing a spray of thin mist to the atmosphere, which may be comprised of flexible, foldable and easily storable tubing. As such, the tubing may be arranged as desired for cooling multiple users simultaneously. Lastly, the invention is easily transportable and storable due to the unique design of the invention housing. The invention may use wheels, rollers, handles, or the like, for facilitating easy transport of the system.

In still another aspect of the invention, the portable mister may include means for introducing a perfume, cologne or other aromatic fragrance, or the like, into the air to enhance the misting experience. The fragrance may be included in or with the droplets as the droplets are dispersed into the atmosphere. Alternatively, the fragrance may be mixed with the cooling agent prior to dispersion. The fragrance may then be perceived by a casual observer who detects the fragrance as a pleasant addition to the environment.

The present invention provides advantages over the prior art in that the present invention provides a mister system for cooling ambient air, which is fully portable, provides means for including a fragrance in a cooling mist, and which is substantially totally contained in one conveniently usable unit. Thus, when taken in combination, the overall portable mister system of the present invention is improved above the prior art.

These features and other advantages of the system and method, as well as the structure and operation of various exemplary embodiments of the system and method, are described below.

BRIEF DESCRIPTION OF THE DRAWINGS

The accompanying drawings, wherein like numerals depict like elements, illustrate exemplary embodiments of the present invention, and together with the description, serve to explain the principles of the invention. In the drawings:

FIG. 1 depicts an exemplary embodiment of the portable mister system in accordance with the present invention;

FIG. 2 is an illustration of an exemplary misting vane/irrigation tubing and nozzles in accordance with exemplary embodiments of the present invention;

FIG. 3 is an illustration of an exemplary housing arrangement in accordance with an exemplary embodiment of the present invention;

FIG. 4 is an illustration of another exemplary embodiment of a portable mister system in accordance with an exemplary embodiment of the present invention;

FIG. 5 is an illustration of an exemplary embodiment of a housing control panel and system processor in accordance with various embodiments of the present invention;

FIG. 6 is a depiction of an exemplary method of operating an exemplary embodiment of a portable mister in accordance with the present invention;

FIG. 7 is another exemplary embodiment of an exemplary portable mister housing in accordance with exemplary embodiments of the present invention; and FIG. 8 is an illustration of a cross-sectional top view of an exemplary portable mister housing in accordance with exemplary embodiments of the present invention.

DETAILED DESCRIPTION

The subject matter of the invention is particularly suited for use in lowering the ambient temperature of atmosphere and cooling one or more system users when positioned outdoors. As a result, the preferred exemplary embodiment of the present invention is described in that context. It should be recognized, however, that such description is not intended as a limitation on the use or applicability of the present invention, but is instead provided merely to enable a full and complete description of a preferred embodiment. That is, the invention is suitable for use indoors or outdoors.

The present invention may be described herein in terms of functional block components, optional selections and various processing steps. Such functional blocks may be realized by any number of hardware and/or software components configured to perform to specified functions. For example, the present invention may employ various integrated circuit components (e.g., memory elements, processing elements, logic elements, look-up tables, and the like), which may carry out a variety of functions under the control of one or more microprocessors or other control devices. Similarly, the software elements of the present invention, where included, may be implemented with any programming or scripting language such as C, C++, Java, COBOL, assembler, PERL, or the like, with the various algorithms being implemented with any combination of data structures, objects, processes, routines or other programming elements. Further, it should be noted that the present invention may employ any number of conventional techniques for data transmission, signaling, data processing, network control, and the like.

Where required, the system user may interact with the system via any input device such as, a keypad, keyboard, control panel, mouse, personal digital assistant, handheld computer (e.g., Palm Pilot®, Blueberry®), cellular phone and/or the like). Similarly, the invention could be used in conjunction with any type of personal computer, network computer, work station, minicomputer, mainframe, or the like, running any operating system such as any version of Windows, Windows NT, Windows 2000, Windows 98, Windows 95, MacOS, OS/2, BeOS, Linux, UNIX, Solaris, or the like, by interfacing the control panel, described below, with, for example, a conventional user computer. One skilled in the art will understand the modifications necessary to include the aforementioned systems in the present invention. In that regard, the modifications are considered within the scope of the present invention.

It should be noted that the terms used in this description have their ordinary meaning unless otherwise specified. For example, the terms "safe" and "unsafe" may be used herein in accordance with their ordinary meanings relative to each other. Further, no element of the invention is considered "critical" or "essential" unless so indicated.

Figure 1:
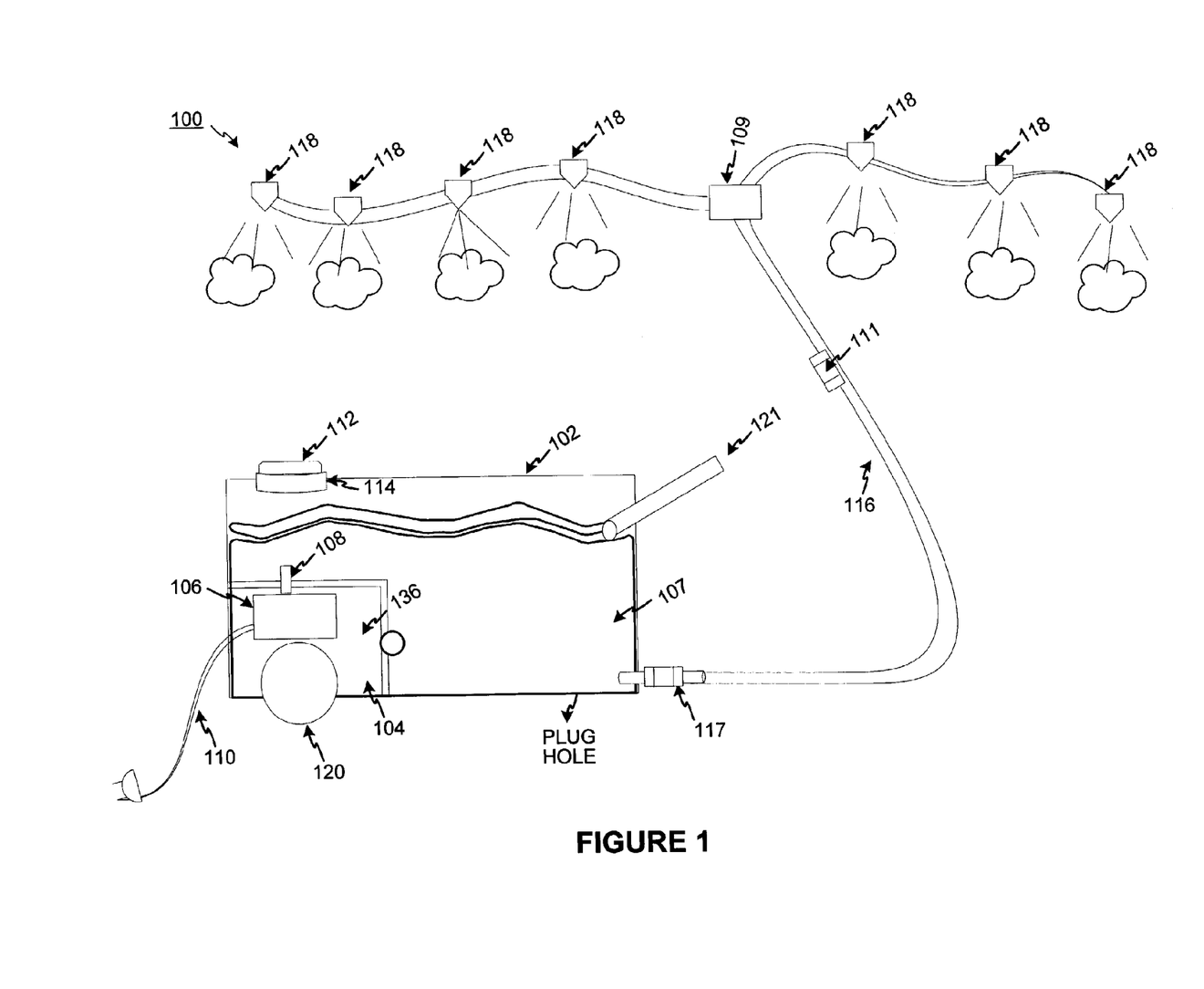

FIG. 1 illustrates an exemplary embodiment of the portable mister system 100 of the present invention. In the exemplary embodiment shown, portable mister system 100 includes a housing 102 having a removable cap 112. A liquid dispersion system including tubing 116 (e.g., irrigation tubing 116) and dispersion nozzles 118 may be connected to housing 102 via connector 117 for providing a passageway for a coolant to travel from the housing 102 to the tubing 116. Housing 102 may further include a compartment 104 including a pump 106 in communication with a second compartment 107 (called "coolant tank 107," herein for brevity) via a conduit 108. System 100 may further include a power chord 110 for powering, for example, pump 106.

Housing 102 may be constructed of any material capable of being compartmentalized for holding a cooling liquid (e.g., water). In that regard, housing 102 may be preferably rigid and waterproof. In one exemplary embodiment, housing 102 may include a coolant tank 107 for holding the cooling liquid during operation. Tank 107 may be waterproof and may be constructed of any suitable material capable of holding a liquid. For example, tank 107 may be comprised of a soft, semi-rigid or rigid plastic, rubber, vinyl, synthetic polymer or the like. It should be noted that housing 102 is described both as including a second compartment 107 and a cooling liquid tank 107. It should be understood that where the second compartment 107 comprises a cooling liquid tank 107, the compartment and tank are discussed interchangeably. However, it is contemplated that the inventor may include a second compartment distinct from the cooling liquid tank.

Figure 8:
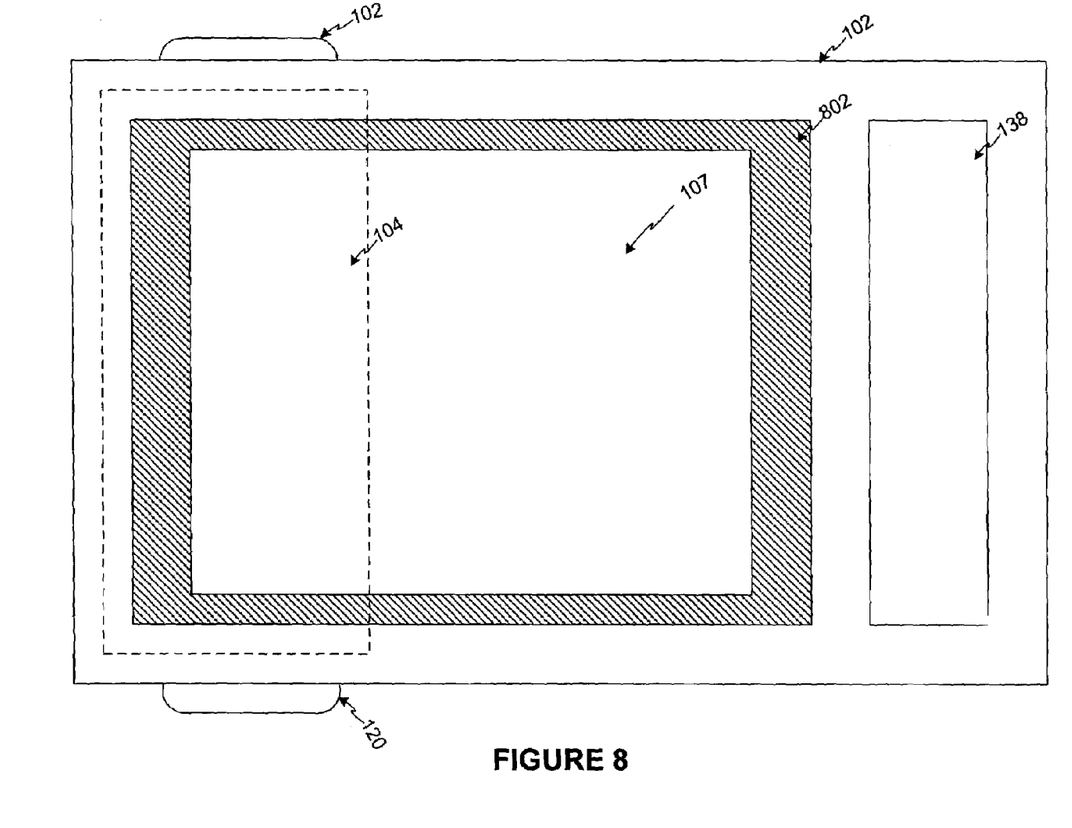

As shown in FIG. 8, tank 107 may be partially surrounded by a cavity 802 in housing 102. Cavity 802 provides a space between the housing 102 and the tank 107 for providing, for example, a thermal agent for regulating the temperature of the coolant. Exemplary thermal agents may include, for example, thermal insulation for regulating the temperature of the cooling liquid in tank 107. Alternatively, the thermal agent may include a cooling agent for reducing the temperature of the cooling liquid, such as, for example, ice, may also be included in cavity 107 for lowering the temperature of the cooling agent. Further, in one exemplary embodiment, housing 102 includes a combination of an insulation and a cooling agent positioned in cavity 802.

Tank 107 may additionally include a removable cap 112 and a filter 114 disposed adjacent thereto. Filter 114 may be any suitable filter for removing particulates from the liquid as the liquid is added. Further, instead of placing the filter 114 as shown, filter 114 may be an in-line filter included in the irrigation tubing 116. Alternatively, filter 114 may be included in tubing coupling 117 between the tank 107 and the tubing 116. Cap 112 may be any means for providing access to the tank 107 for adding, for example, a cooling liquid. Preferably, cap 112 forms a substantially airtight seal with tank 107. In one exemplary embodiment, cap 112 is a screw cap including a threading around its inner perimeter which mates with a threading on tank 107 for permitting the cap 112 to be twisted on and off. When twisted off, a system user is provided access to the inside of tank 107. When the cap 112 is twisted on, a relatively airtight seal may be created between the cap 112 and tank 107.

Housing 102 may further include a first compartment 104 which includes pump 106. Compartment 104 may be such that it is sealed from tank 107 to prevent any cross-generation of chemicals or liquids between the tank 107 and compartment 104. The compartment 104 may include a noise insulation for dampening any noise generated by the system pump 106. The compartment 104 may additionally include a door (not shown) or passageway for providing access to the inside of the compartment 104. Preferably the door is of sufficient size to permit replacement or repair of, for example, pump 106. Further, housing 102 may include a pair of wheels 120 and a handle 121 for aiding in transporting the system 100. Compartment 104 may additionally include one or more openings or grommets, etc. (not shown), for passing an electrical cord 110 therethrough or for the insertion of a conduit (e.g., conduit 108, connector 117, tubing 116).

Electric cord 104 may be used to provide power to the pump 106. For example, cord 110 may be plugged into a standard 120V socket. Alternatively, pump 106 may be powered by dc current using a battery (not shown) which may be positioned in compartment 104 in proximity to pump 106. In which case, compartment 104 may be suitably sealed against, for example, leakage of the liquid in tank 107 into the compartment, or leakage of the electrolytic battery chemicals into tank 107.

In one exemplary embodiment, pump 106 may be any pump for forcing air into tank 107 via conduit 108. Preferably, the air pumped by pump 106 is ambient air, and most preferably, the temperature of the air is cool relative to the temperature of the cooling liquid in tank 107. In that regard, pump 106 may be any air pump which is capable of pumping air into tank 107, thereby increasing the volume of free space in tank 107 and forcing the liquid into irrigation tubing 116. The air for pumping may be drawn from outside housing 102 via an opening of port 136. A suitable pump for use with the invention includes any bladder or diaphragm pump having cylinders, as are commonly found in the art. For example, a B series pump produced by SENSODYNE®, 16333 Bay Vista Drive, Clearwater, Fla. 33760, may be suitable for use with this invention.

Tank 107 may be placed in communication with irrigation tubing 116 via a tubing connector 117. Connector 117 may be any suitable connector for connecting irrigation tubing to tank 107, thereby providing an airtight or watertight passageway through which a cooling liquid may travel. As such, connector 117 is suitably positioned in one side of tank 107. Preferably, the connector 117 is disposed in proximity to the bottom portion of the tank 107 to ensure that the liquid will be provided to the tubing 116, when the liquid is at its lowest fill level inside tank 107. Additionally, it is preferred that the connector 117 and the tank 107 form a leak-proof seal.

Figure 2:
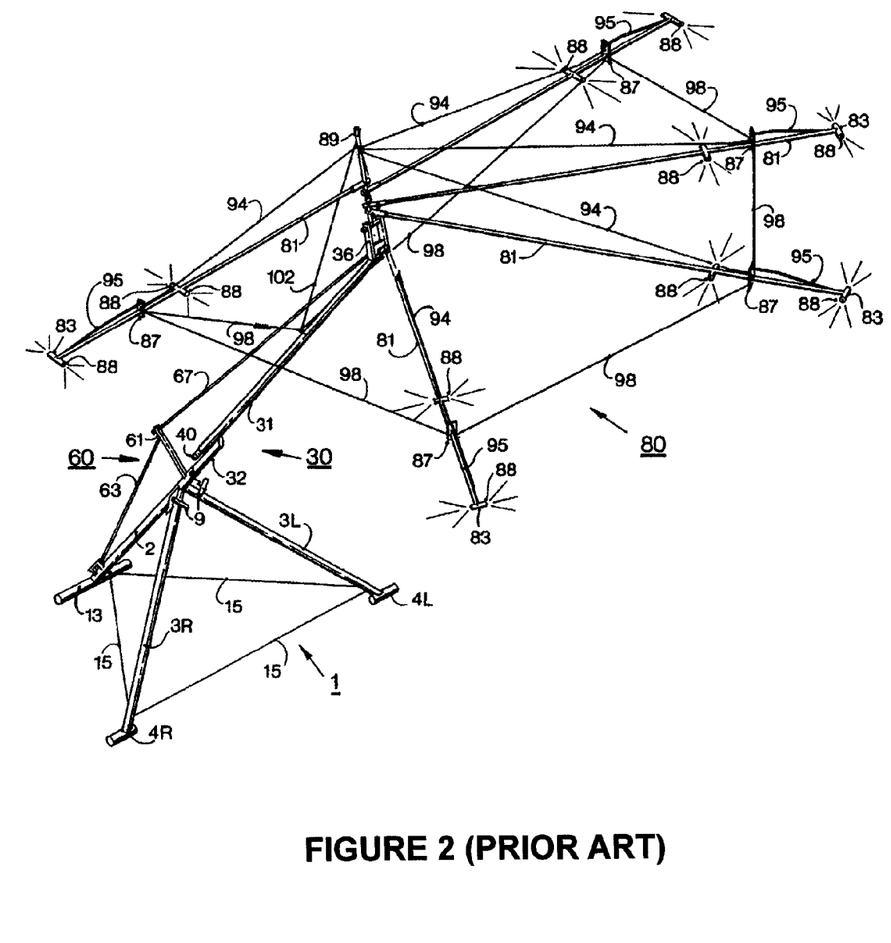

Connector 117 may be further coupled to irrigation tubing 116 having nozzles 118 for dispensing a mist of cooling liquid. Tubing 116 may be constructed of any suitable material for conveying a fluid. In that regard, tubing 116 may be made of a rubber, plastic, or the like, and preferably, the tubing is UV resistant to permit the tubing to withstand the damaging effects of direct sunlight. The tubing 116 may be treated with, or include, materials or compounds for retarding floral or bacterial growth. Tubing 116 may also be flexible, and may include portions which are rigid. As such, tubing 116 may be arranged in any suitable manner for misting a desired area. Tubing 116 may be affixed to any structure capable of holding the tubing for positioning the nozzles 118 to spray or mist. The tubing 116 may be affixed using any conventional method for holding an article affixed substantially stationary to another article. For example, the tubing 116 may be affixed using tape, nails, screws, Velcro®, or the like. Preferably, during operation, tubing 116 is placed at a height sufficient for permitting the mist to drop onto a system 100 user. For example, the tubing may be placed on a patio overhang, hung from a tree, or the like. In one exemplary embodiment, tubing 116 may include a tubing support apparatus which may be segmented into multiple pieces, and which may be assembled in any desired shape. U.S. Pat. No. 5,337,960, issued Aug. 16, 1994, to Allen, discloses a suitable irrigation tubing arrangement which may be used with the present invention. As shown in FIG. 2, the Allen patent discloses a lightweight, portable and collapsible support apparatus for pressurized water conveyance and overhead mist spraying nozzles 88.

In one exemplary embodiment, the nozzles 118 may be any conventional nozzles which may be used for atomizing a liquid. Nozzles 118 may be comprised of a rust resistant metal, such as, for example, copper, or the nozzles 118 may be treated with a rust resistant compound. The nozzles 118 may include an entrance opening for accepting a liquid at a first velocity and an exit opening for emitting or ejecting the liquid of a higher velocity. The nozzles 118 may be adjustable in spray volume, pattern, direction and/or droplet size. For example, the nozzles 118 may be pivotable, such that the spray of cooling liquid emanating therefrom may be directed as desired. Further, the nozzles 118 may be configured to provide multiple spray patterns. For example, a user may adjust the nozzles 118 opening to spray in the shape of a cloud wherein the cooling liquid is substantially completely atomized. Alternatively, the nozzles 118 may be adjusted such that less atomization takes place and the cooling liquid droplets are of a larger size providing for a heavier mist. Further, a user may adjust the nozzles 118 to emit the cooling liquid in a cloud, cone, stream or other shape.

It should be noted that to achieve proper dispersion of the cooling liquid from nozzles 118, an appropriate level of liquid pressure must be ordinarily maintained inside of irrigation tubing 116. As such, alternate embodiments of the invention described herein may include a pressure regulator. A pressure regulator suitable for the invention may ensure that the liquid pressure is maintained relatively constant in tank 107, tubing 116, and/or at the nozzles 118, so as to ensure proper dispersing of the liquid cooling agent.

FIG. 1 depicts a suitable pressure regulator 111 in communication with the tubing 116. As shown, the pressure regulator 111 may be an in-line pressure regulator configured to ensure that the liquid pressure in tubing 116 is maintained at a sufficient level to promote dispersion of the liquid from nozzles 118. Preferably, the pressure is maintained at a sufficient level to promote dispersion of the liquid in the desired dispersion pattern. A suitable in-line pressure regulator, which may be used in exemplary embodiments of this invention, is disclosed in U.S. Pat. No. 5,035,260, issued Jul. 30, 1991, to Davey.

Although, FIG. 1 depicts an in-line pressure regulator, the invention is not so limited. For example, other suitable pressure regulators capable of regulating the liquid pressure in the portable system 100, thereby promoting dispersion of the liquid from the tubing 116 and/or nozzles 118, may be used. For example, system 100 may include a pressure regulator configured to regulate the pressure at an outlet of a tank 107 containing a liquid, such as a liquid coolant. The regulator (not shown) may be disposed or fitted in the housing of the tank, wherein the regulator is not in contact with the liquid, but instead regulates the pressure in the tank by, for example, comparing the pressure inside the tank with ambient pressure and adjusting the pressure in the tank accordingly to a predetermined target pressure. Alternatively, the regulator (not shown) for regulating the output pressure of the tank may be positioned in the housing 102 and in-line with the tubing 116. In one particular example, the regulator may be positioned in proximity to the connector 117. The regulator thusly positioned may regulate the output pressure by measuring the pressure in the tank relative to the pressure in the tubing. Suitable exemplary pressure regulators, which may be used in accordance with the above, are disclosed in U.S. Pat. No. 6,186,168 B1, issued Feb. 13, 2001, to Shultz et al., and U.S. Pat. No. 5,595,209, issued Jan. 21, 1997, to Atkinson et al., for example.

One key advantage of the present invention over the prior art is the ability of the system 100 user to include a fragrance in the misting cooling liquid. The fragrance may be included in the cooling liquid prior to providing the liquid to tank 107. Alternatively, the fragrance may be included in the liquid after the liquid is filled into tank 107. Further still, the fragrance may be added when the cooling liquid traverses through, or is emitted from, irrigation tubing 116. By adding a fragrance to the cooling liquid, a user is able to include in the cooling mist a pleasant experience enhancing smell. For example, a user could add a rose or springtime fragrance which may be included in the mist, and which may be perceived by the casual observer.

Figure 4:
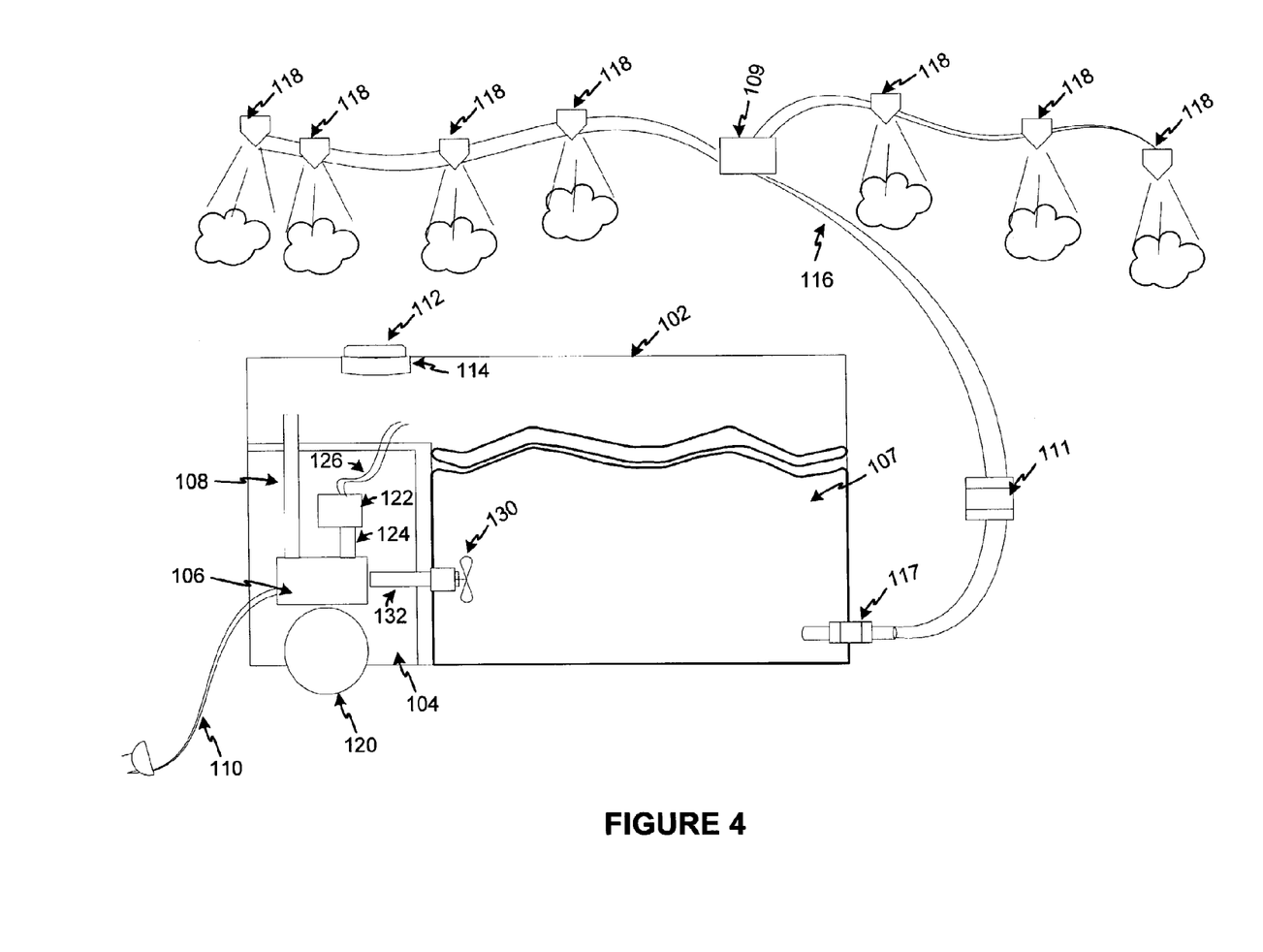

Referring now to FIG. 4, an alternate exemplary embodiment of the system 100 is depicted including a fragrance container 122 which may be connected to pump 106 via a conduit 124, and to cooling tank 107, in waterproof fashion. Container 122 may be any suitable container for holding a liquid, such as, a fragrance. The fragrance may be any suitable fragrance which may be readily mixed in a liquid. Preferably the fragrance may be mixed with the cooling liquid in tank 107 such that no "clumping" exists. That is, the liquid and the fragrance are mixed such that they may not be easily physically separated. In that regard, the fragrance is preferably a liquid. In addition, container 122 may be in communication with tank 107 via conduit 126, such that the fragrance held in container 122 may be added to the cooling liquid contained therein. As such, container 122 may include means for providing the fragrance to the tank 107, such as, a conventional fluid ejector nozzle as are known in the art. The ejector nozzle may be included in the conduit 126 disposed inside tank 107. The ejector nozzle may be included, for example, in a pneumatically operated sprayer, as are found in the art.

In one exemplary embodiment, container 122 includes a pump (not shown) for facilitating the providing of the fragrance to the tank 107. The fragrance container 122 pump may be any suitable pump for pumping a liquid. The container 122 pump may preferably include an inlet in communication with the fragrance, preferably via a hose. The container 122 pump also preferably includes an outlet which is in communication with the tank 107 for providing the fragrance therein. In one exemplary embodiment, the container 122 pump is electrical and may be powered via alternating or direct current (e.g., battery). Alternatively, the container 122 pump may be pneumatic. Where the container 122 pump is pneumatic, it may be powered by air provided by pump 106. For example, attached to pump 106 may be a conduit 124 for diverting some of the air generated by pump 106 to the container pneumatic pump. The container 122 pump may be such that the air from pump 106 causes the container 122 pump to pump fragrance into the tank 107. Preferably the fragrance is pumped in a liquid or solid (powder-like) form, and most preferable, the fragrance is pumped into the tank 107 in a liquid solid mixture or the like.

In an alternative embodiment, the fragrance container 122 may not include a pump, but instead may include a pneumatic sprayer in communication with pump 106 via conduit 124. Conduit 124 may divert a portion of the air generated to the pneumatic sprayer for spraying the fragrance into the tank 107. Suitable sprayer/mixer arrangements which may be used with this invention to include a fragrance in the liquid coolant are disclosed for example in U.S. Pat. No. 6,156,159, issued Dec. 5, 2000, to Ekholm et al.; U.S. Pat. No. 6,103,128, issued Aug. 15, 2000, to Koso et al., U.S. Pat. No. 5,902,042, issued May 11, 1999, to Imaizumi et al.; U.S. Pat. No. 6,305,580 B1, issued Oct. 23, 2001, to Chen; U.S. Pat. No. 6,296,151,B1, issued Oct. 2, 2001, to Chen; U.S. Pat. No. 5,676,283, issued Oct. 14, 1997, to Wang; U.S. Pat. No. 6,598,803 B1, issued Jul. 29, 2003, to Haas et al.; and U.S. Pat. No. 6,216,966 B1, issued Apr. 17, 2001, to Prendergast et al. Those skilled in the art will recognize that various modifications may be made to the above noted patents without departing from the scope of the invention.

With continued reference to FIG. 4, housing 102 may include a mixer 130 for ensuring substantially complete mixing of the fragrance and cooling liquid combination when the fragrance is added. Mixer 130 may be any suitable mixer capable of mixing two liquids, a solid and a liquid or any similar configuration capable of mixing a fragrance promoting composition with cooling agent. Mixer 130 may be electric and may include its own motor (not shown). Alternatively, mixer 130 may be pneumatic, and may be powered by air provided by pump 106 via conduit 132, in similar manner as was discussed with respect to the container 122 pump. Suitable mixers which may be used with the invention include for example, any mixer operable to blend, mix, or aerate a liquid such as a cooling liquid.

Figure 7:
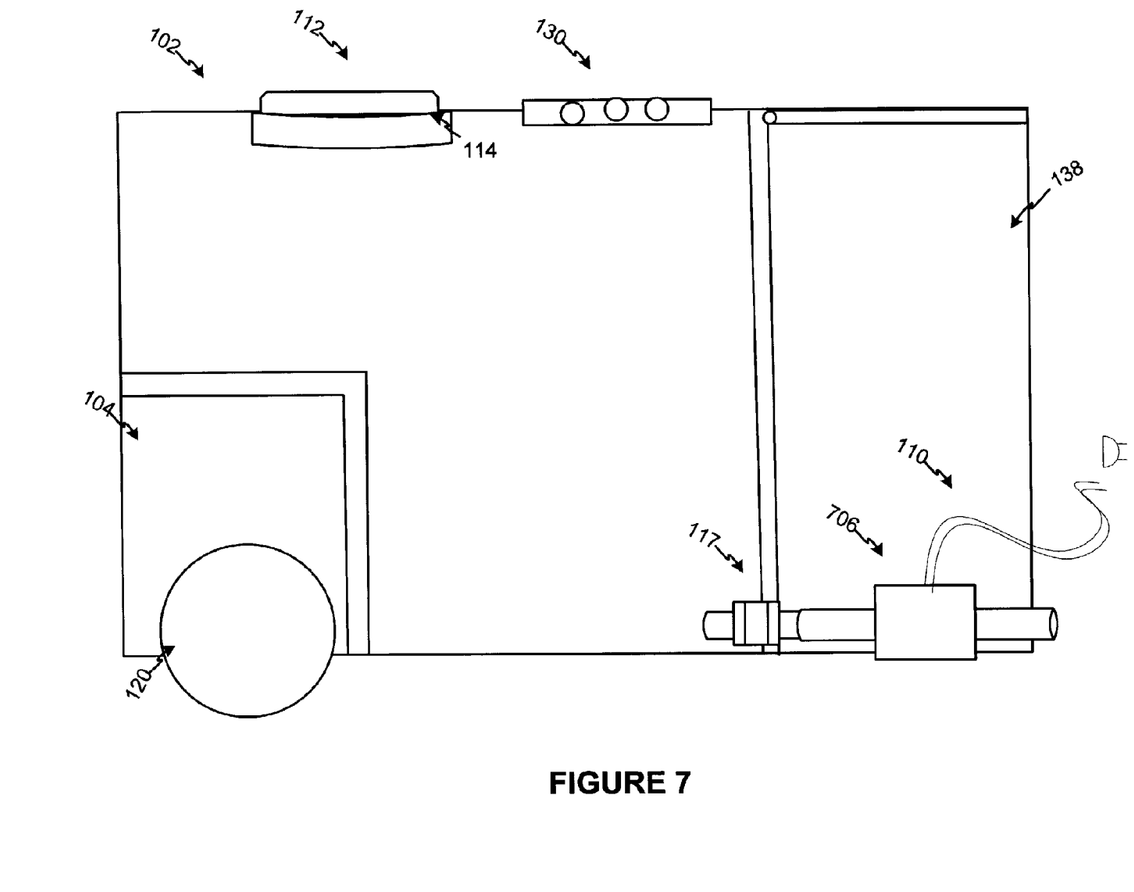

FIG. 7 depicts another exemplary embodiment of the present invention wherein system 100 includes a pump 706. Pump 706 pumps the cooling liquid from tank 107, and provides the liquid to tubing 116. In this exemplary embodiment, the pump 706 may be an in-line diaphragm pump of sufficient pumping capacity to ensure that the cooling liquid may mist from nozzles 118. The pump 706 may be a high-pressure self-priming pump, such as, for example, those manufactured by SHURflo®.

It should be noted, that where an in-line pump 706 is used as described above, it may not be necessary for the cap 112 and the tank 107 to form an airtight seal. That is, it may be required that the pump 706 experience minimal pressure inside tank 107 during operation to enable the pump 706 to efficiently draw the liquid from the tank 107. More particularly, when the liquid is removed from tank 107, the volume of the free space in the tank must also increase to ensure proper liquid removal. As such, the housing 102, tank 107 and/or cap 112 may be provided with air holes or openings (e.g., apertures) (not shown) in the housing 102, tank 107, or cap 112 top surface to permit air to be drawn into the tank 107 as the cooling liquid level decreases. Alternatively, the invention may be operated with the cap 112 removed or loosened to permit air to be drawn into the tank as the level of the coolant decreases. Further still, pump 706 may be configured such that the needed air is provided by the pump 706, as described below.

Figure 3:
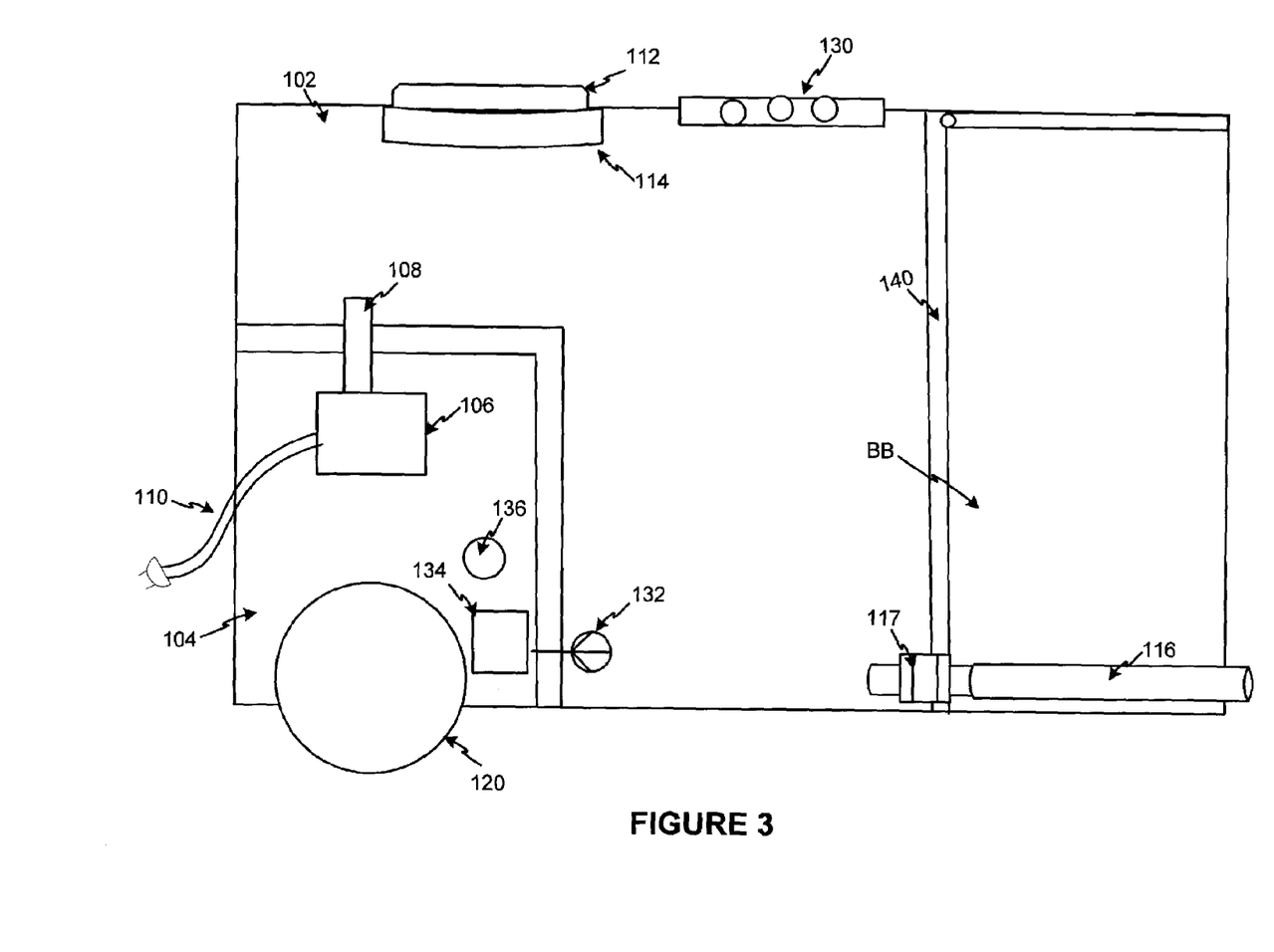

As shown in FIGS. 3 and 7, housing 102 may further include a second compartment 138. Compartment 138 may be of sufficient size to store flexible irrigation tubing 116. In addition, compartment 138 may be of sufficient size to store any tubing supports such as those which are depicted in FIG. 2.

System 100 may further include sensors 132 shown in FIG. 3, for reporting the operational status of various elements of the invention. In that regard, sensors 132 may be any micro or macrosensors capable of translating a physical occurrence in an environment to a perceptive analog or digital signal. The sensors 132 may include, for example, pressure, temperature, or positional sensors, transducers, or the like. For example, a sensor 132 may be any suitable sensor (i.e., pressure sensor or temperature sensor) for sensing and reporting the level of the cooling liquid in tank 107. A sensor (not shown), such as a pressure sensor, may also be included adjacent to the nozzles 118 for detecting the emission of the cooling liquid from the nozzles 118. In addition, a position sensor (not shown) may be included adjacent to cap 112 for detecting whether the cap 112 is tightly affixed to tank 107.

Figure 5:
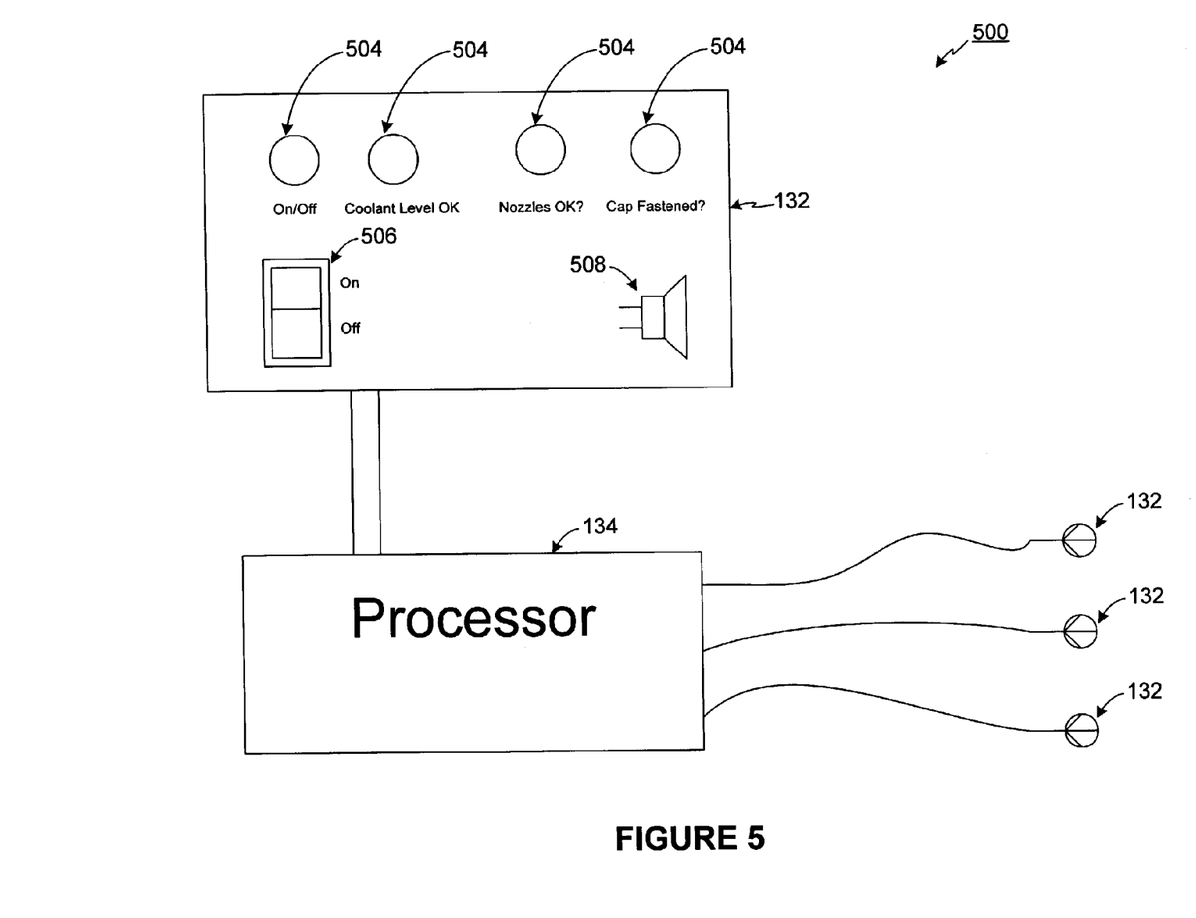

The aforementioned sensors may be in communication with a processor 134 which may be in further communication with a control panel 130, as best shown in FIG. 5. Processor 134 may be any suitable processor capable of receiving a signal from a sensor and providing a responsive signal to a control panel 130. For example, processor 134 may be any conventional processor or microprocessor configured to provide a "safe operation" or "unsafe operation" signal to the control panel 130. In addition, processor 134 may be any conventional processor or microprocessor for providing an "enable signal" or a "disable signal" for operation of the various system components as described below. Conventional sensors, such as these, are known in the art, and will not be discussed herein for brevity.

Control panel 130 includes means for activating/deactivating system 100 operation. For example, control panel 130 may include a power switch 506 for turning the system 100 off and on. The control panel 130 may further include visual indicators 504 for indicating the status of the sensed components. The visual indicators 504 may be, for example, lights or a LED display. The indicators 504 may flash intermittently or not at all. Additionally, the indicators 504 may change colors. For example, where the indicator flashes the color red, the indicator may inform the user that a particular condition exists which is not preferred. For example, the cooling liquid level may too low for safe operation of the invention. Alternatively, the visual indicator may flash green to indicate that safe operation of the invention is permitted.

In addition to the visual indicators 504, control panel 130 may include means for providing an audible notification of operational status. For example, the control panel 130 may include a speaker 508 for audibly indicating that a status of the invention has changed. On the other hand, the speaker 508 may notify a user that safe operation of the invention is permitted. The audible indications may be, for example, one or more tones perceptible by the human ear.

It should be noted, that the present invention may include alternate means for informing a user of system status. For example, the visual and audible indications may be used simultaneously. Alternatively, the system 100 may include means for providing tactile indications of system operational status, which may or may not be used in conjunction with one or more of the visual and audible indications. For example, the tactile indications may be perceived as a mild or moderate vibration of the system housing 102. In that regard, system 100 may include means for facilitating a shaking of a portion of system 100 housing when, for example, the system 100 is to be placed in an inoperable state.

The processor 134 may additionally be connected to at least one of the elements of system 100 for controlling the operational status of these elements. For example, processor 134 may be connected or in communication with pump 106, 706, container 122 pump, and/or mixer 130. The processor 134 may be configured to enable or disable those elements as required. Processor 134 may enable or disable the operation of an element by providing an appropriate signal to the element.

Control panel 130 may additionally include switches, buttons, or the like, for use in notifying the user that an element is to be disabled by processor 134. For example, one button may give indication that a signal is provided to the processor, which disables operation of the mixer 130. The signal may be received from an appropriate sensor (e.g., motion, positional) and provided to the processor 134, which may then provide a signal to the mixer 130 causing the mixer 130 to cease operation. In similar manner, control panel 130, may include indicators for notifying a user that a signal is provided by processor 134 for disabling/enabling the operation of the pump 106, 706.

Figure 6:
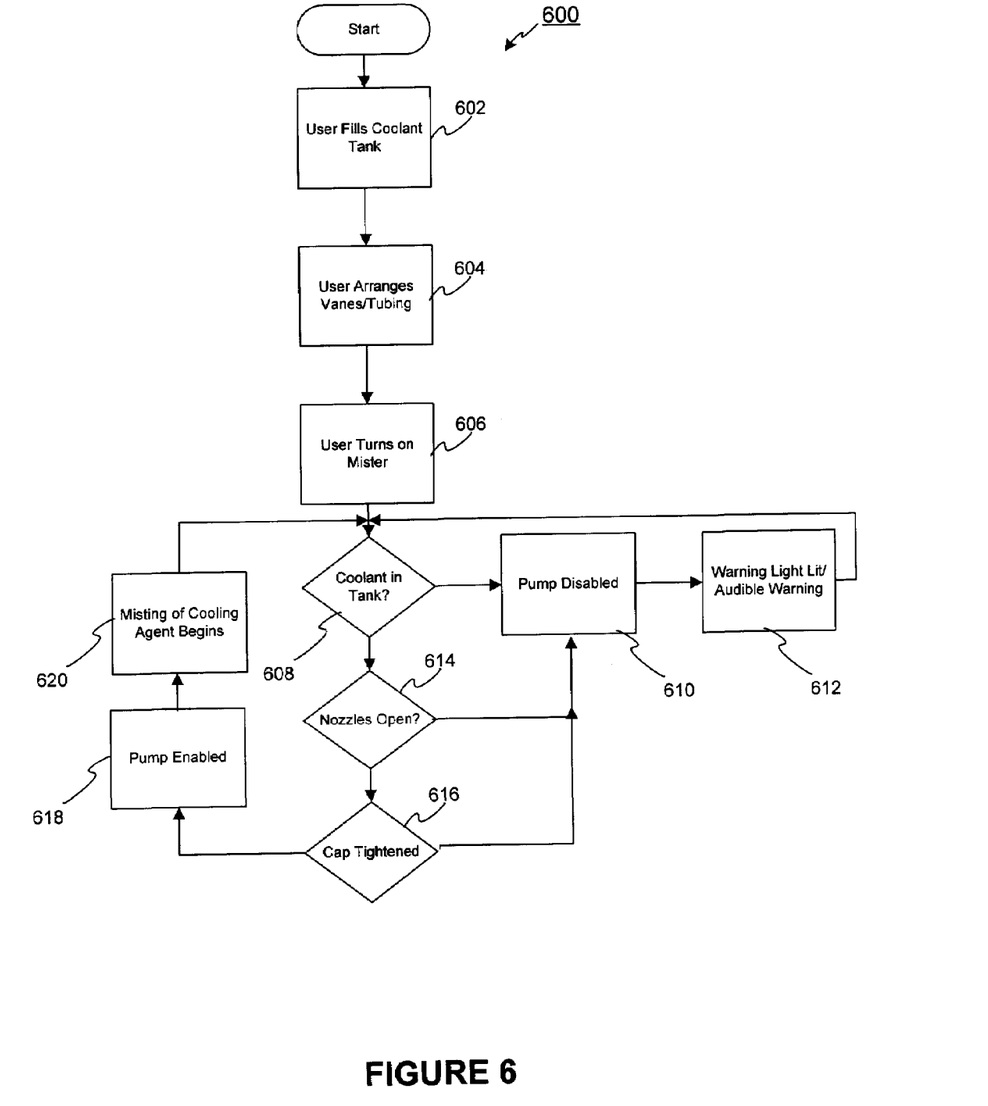

FIG. 6 is an illustration of an exemplary method 600 of operating the portable mister system 100 in accordance with the invention. The method may begin with a user filling the tank 107 with a cooling agent, such as, for example, water (step 602). However, it should be noted that the present invention is not so limited. That is, although the invention is described with respect to a water misting agent, any liquid or aqueous cooling agent capable of misting may be employed. Typical liquid or aqueous cooling agents for use with the invention may include additives for facilitating cooling. Such cooling agents are well known, and as such, will not be discussed herein for brevity.

The user may then arrange the irrigation tubing 116 including the nozzles 118 such that a mist emitted from the nozzles 118 will blanket a predetermined area (step 604). For example, where a user wishes to cool the environment surrounding a back yard patio, the user may place the irrigation tubing 116 on a patio awning or overhang to ensure that those persons positioned on or around the patio experience the evaporative cooling affects of the misting cooling agent. Once the irrigation tubing 116 is properly arranged, the user may then turn on the mister by, for example, activating a power button 506, or the like (step 606).

Where the invention includes sensors 132, the sensors 132 may be arranged to provide indication of the status of certain components of the system 100. The sensors 132 may be configured to ensure safe operation of the invention by reporting the status of, for example, the level of coolant, whether the nozzles 118 are functional, and/or whether the cap 112 is securely fastened, etc. As such, more or less sensors may be included in the invention as needed. In the exemplary embodiment shown, the system 100 may include a sensor for sensing the level of cooling liquid (e.g., cooling agent) included in the tank 107 (step 608).

Where the cooling agent falls below a predetermined level inside tank 107, the motor 106 may overheat thereby increasing the risk that a fire safety hazard would result. As such, the tank sensor 132 is configured to provide an "unsafe operation" signal to the processor 134 when the liquid falls below the predetermined level inside tank 107. The processor 134 may receive the "unsafe operation" signal and disable the pump 106 preventing the pump 106 from initiating or continuing operation (step 610). The processor 134 may further provide an "unsafe operation" signal to the control panel 130.

The control panel 130 may then provide a visual or audible (or tactile) indication to the user thereby informing the user that an unsafe condition exists which prevents safe operation of the system 100 (step 612). The unsafe operation indication may be provided to the user in the form of warning lights 504 or an audible tone or message emitted from a speaker 508. The user is then permitted to correct the unsafe condition and the system processor 134 re-checks the sensor to determine if the unsafe condition remains (e.g., step 608). The processor 134 may check and/or the sensor 132 may provide the status signal at some predetermined period or continuously. If the unsafe condition remains, then the pump 106 remains disabled. Further, where the system 100 includes more than one pump, such as, for example, a fragrance pump 122, the processor 134 may disable one or all of the pumps as desired. For example, if the operation of only one pump may cause an unsafe operation condition, then that one pump may be disabled while the other pumps included in system 100 remain in operation. Alternatively, processor 134 may disable all pumps until the identified unsafe condition is corrected.

In similar manner as with tank 107, the system 100 may include sensors for detecting whether the nozzles 118 are operational or open (step 614). In this context, the nozzles 118 may be considered "operational" or in "safe operation" when one ore more of the nozzles is arranged, positioned and/or configured to permit a cooling liquid to be emitted therefrom (e.g., nozzles are "open"). In contrast, the nozzles 118 may be considered "nonoperational" or in "unsafe operation" where one or more of the nozzles 118 is arranged, positioned and/or configured to prohibit the free flow of a cooling liquid therefrom (e.g., nozzles are "closed").

For example, one suitable sensor may detect a pressure or temperature change at the nozzle 118 opening due to the dispensing of the cooling agent into the atmosphere. That is, since the pressure and/or temperature at the opening of the nozzle 118 changes as the cooling agent is emitted therethrough, such change may be reported to the processor 134 in the form of a "safe operation" or "unsafe operation" signal. Where the safe operation signal is received by the processor 134, the system 100 may continue with additional safety checks. Alternatively, if no change in pressure or temperature is detected/sensed at the nozzles 118 opening, then the sensor may provide the processor 134 with an unsafe operation (e.g., nozzles 118 are closed) signal and the processor 134 may disable the pump 106 accordingly (step 610). The processor 134 may then provide a warning signal to the user (step 612) and perform additional checks to see if the unsafe condition has been corrected (e.g., nozzles 118 are open) (step 614).

As noted with respect to one exemplary embodiment of the invention, the pump 706 may be an in-line self-priming pump which provides the coolant directly to the irrigation tubing 116. In this case, it may be required that there be provided means for increasing the volume of free space in the tank 107, once the cooling liquid is pumped out (e.g., removed) from the tank. As noted, this particular embodiment may require there to be air holes (not shown) included in the top surface of the housing 102, tank 107, cap 112, or the like, for permitting ambient air to be drawn into the tank 107 during system 100 operation.

On the other hand, when pump 106 is configured to operate to remove the cooling liquid by forcing air into tank 107, thereby forcing the cooling liquid into tubing 116, there ordinarily needs to be an airtight seal created in tank 107. More particularly, there may ordinarily need to be an airtight seal created between cap 112 and tank 107. The airtight seal, for example, permits the air pressure in the tank be controlled so that the pressure in the tubing 116 for proper dispersion of the liquid at nozzles 118 may be maintained. As such, the system 100 may include a sensor (e.g., positional sensor) for detecting whether the cap 112 is tightly secured to tank 107 so as to create the needed airtight seal (step 616).

If the cap 112 is not tightly secured, a cap sensor may provide an "unsafe operation" (e.g., cap 112 is open) signal to the processor 134. The processor 134 may then provide a disable signal to the pump 106 for disabling pump 106 operation (step 610) and may also provide an indication signal to the appropriate control panel 130 indicator for notifying a user that the cap 112 is not tightly affixed to tank 107 (step 612). The system 100 processor 134 may then check and re-check the signal received from the cap sensor to determine if the unsafe condition still exists (step 610). If so, then the processor 134 continues disabling pump 106 and the system 100 is not operational.

In some instances, the invention may include a pressure regulator, as noted above. In certain exemplary embodiments, the pressure regulator may be used to enhance the safe operation features of the invention. For example, the pressure regulator may be in communication with the processor 134, such that when the processor receives an unsafe operation signal, the processor 134, may provide a "disable pressure regulator signal" to the pressure regulator for disabling regulator operation. In this instance, "disabling operation" of the regulator may mean prohibiting normal regulator function, by for example, operating the regulator such that pressure build up in the tank 107, tubing 116, or at the nozzles 118, is not achieved. More particularly, the disabled pressure regulator may be operated such that minimal pressure exists in system 100, and even more particularly, the pressure in system 100 is such that dispersion of the liquid from nozzles 118 is interrupted.

It should be noted that the present checks for unsafe conditions could include checking the status of any component of system 100. Preferably, the system sensors check to determine if any of the components may be operated in an unsafe manner. As such, system 100 may include sensors for checking any number of the system 100 components and the sensors may be in communication with the processor 134 and control panel 130 in similar manner as discussed above.

Further, the processor 134 may be configured to check one or more sensor components simultaneously or in a predetermined order. The processor 134 may check the sensors one or more times during system operation. For example, the processor 134 may check the sensors when the operation of the system 100 is initiated, and may additionally check periodically throughout the operation of the system 100, such that if an unsafe condition results, the operation of one or more of the system components or the entire system 100 may be disabled. In any event, where the processor 134 detects that an unsafe condition does not exist or has been corrected, the processor 134 may provide an enable signal to the pump(s) or other system element, permitting the system 100 to operate (step 616).

Once the pump 106 is initiated and permitted to operate, the pump 106 pumps air into the tank 107, thereby forcing the cooling liquid contained therein into irrigation tube 116. For example, pump 106 may provide ambient air from outside the housing 102 (via port 136), to the tank 107 via conduit 108. The air may fill the tank causing pressure to rise in the free space therein. As the air is provided, the tank 107 may become pressurized, and the cooling liquid may escape through the tubing 116, thereby creating additional free space for the pumped in air.

In an alternative embodiment, pump 706 may be an in-line self-priming pump, which pumps the cooling liquid from the tank 107 into the tubing 116. The cooling liquid may be pumped directly from the tank 107 into the tube 116. During pumping, air may be provided to the tank 107 passively. That is, as the liquid moves into the tubing 116 from the tank 107, free space may be created in the tank by the escape of the cooling liquid into the tube 116. Air holes may be provided in the tank 107, housing 102 or cap 112, for example, for permitting the air to enter the tank 107, thereby allowing the liquid to be provided to the tubing 116. Alternatively, air may be provided to the system 100 via operation of the pump 706. For example, the pump 706 may be affixed with a first opening for receiving the cooling liquid, a second opening for providing the liquid to the tubing 116, and a third opening for drawing in additional air. Such pumps are well known and will not be discussed herein for brevity.

Upon entering the tubing 116, the cooling liquid becomes pressurized in part, because the liquid is forced into tubing 116 having a relatively small cross-sectional area as compared to the area of the tank 107. Additionally, the pumping action of the pump 106, 706 causes the liquid to assume a certain velocity when traveling through the irrigation tubing 116. Thus, the velocity of the liquid and the forcing/pumping action of the pump 106, 706 causes the cooling liquid to be delivered to the nozzles 118 in a pressurized state. Once the nozzles 118 are opened, the pressurized liquid may be provided from the dispensing end of the nozzles 118 into the ambient air at a higher velocity than when the liquid entered the tubing 116. The cooling liquid may be emitted from any one of the nozzle 118 openings in, for example, the shape of a spray, which may assume any desired shape or spray pattern. Preferably, the nozzles 118 emit the cooling liquid in the shape of a cloud, and most preferably, the liquid is emitted in the shape of a mist.

Having been emitted into the atmosphere, the cooling agent may begin descending and may begin evaporation. The cooling agent may evaporate when emitted into the atmosphere or when it settles on a surface waiting below. As noted, the evaporative quality of the mist is such that the surface receiving the mist may be readily cooled.

In summary, the present invention provides a portable mister which has advantages over the prior art in that the invention is more portable and more convenient to use. For example, the invention is substantially self-contained, in that the cooling liquid is included in a part of the system housing, thereby eliminating the need to provide a source of cooling liquid to the system during operation. The invention additionally may include a means for providing in the mist, an experience enhancing fragrance. Further, the invention provides advantages over the prior art in that means for determining safe operation of the invention are included therein.

The preceding detailed description of exemplary embodiments of the invention makes reference to the accompanying drawings, which show the exemplary embodiments of the invention by way of illustration. While these exemplary embodiments are described in sufficient detail to enable those skilled in the art to practice the invention, it should be understood that other embodiments may be realized and that logical and mechanical changes may be made without departing from the spirit and scope of the invention. For example, the steps recited in any of the method or process claims may be executed in any order and are not limited to the order presented. Additionally, the present invention may include any construction or arrangement of a control panel and sensors for sensing unsafe operating conditions of the system and reporting unsafe operation indications to the user. Further, the invention may include any conventional nozzles, irrigation tubing, couplings, connectors, processors, pneumatic, electrical or mechanical sprayers as are found in the art. Further still, the housing of the present invention may assume any shape, and may include any form of irrigation tubing storage, wheels or handles as desired. For example, the housing may be oval, square, polygonal, oblong, or the like, and the tubing may be stored on the outside of the system housing. The housing may include disposed therein, means for eliminating any standing cooling agent remaining in the cooling liquid tank thereby prohibiting the growth of bacteria therein. The means may, for example, be a removable plug positioned in a bottommost portion of the system housing or tank for draining any cooing liquid remaining in the cooling liquid tank when the system is not in use. Even further, the cooling liquid tank 107 may take any shape or construction suitable for holding a liquid, and may take the shape of the system housing. Yet further, the components included herein may be mechanical, electrical, pneumatic, or any combination of the above as is dictated by the environment the portable misting system uses.

The invention in its broadest aspects is therefore not limited to the specification details, preferred embodiment, and illustrative examples shown and described. The above aspects and embodiments of the present invention are understood with reference to the attached claims, specification and drawings included herewith.

What is claimed is:

1. A portable mister system for adjusting ambient temperature comprising:
   a. a portable housing for substantially containing a coolant therein, the portable housing including a first opening for providing the coolant, the portable housing sealed to prevent escaping liquid, the portable housing including a second opening for providing an exit way for said coolant;
   b. a first pump for facilitating the removal of the coolant from said portable housing, the first pump in communication with said portable housing;
   c. an irrigation tubing in communication with the second opening, the irrigation tubing operable to transport the coolant to a group of nozzles;
   d. a splitter in the irrigation tubing for dividing the irrigation tubing into a more than one tubing segment for a more uniform dispersion pattern;
   e. a warning system for notifying a user of unsafe operating conditions and ceasing operation of the first pump; and
   f. a power source in communication with the first pump for facilitating operation of the first pump,
      wherein the coolant is added prior to operation of the portable mister system, wherein the more than one tubing segment can be arranged in different positions, and wherein the portable mister system ceases operation when the coolant provided to the portable housing reaches a predetermined level.

2. A system of claim 1, wherein the portable housing includes a first compartment for including a thermal agent for regulating the temperature of the coolant.

3. A system of claim 2, wherein the thermal agent is a thermal insulator.

4. A system of claim 2, wherein the thermal agent is a cooling agent.

5. A system of claim 1, wherein the portable housing includes a second compartment in communication with the portable housing for a fragrance agent, the fragrance agent configured to be combined with the coolant, and wherein the portable housing includes a fragrance mixer in communication with the sortable housing for mixing the coolant and the fragrance agent within the portable housing.

6. A system of claim 5, wherein the fragrance mixer is in communication with the first pump.

7. A system of claim 5, comprising a fragrance pump for facilitating the inclusion of the fragrance agent in the coolant.

8. A system of claim 1, including a third compartment for storage of the irrigation tubing in a compact manner.

9. A system of claim 1, wherein the first pump is powered by a self-contained battery.

10. A system of claim 1, wherein the first pump is powered by placing the first pump in communication with a 120V power source.

11. A system of claim 1, wherein the group of nozzles is configured to disperse the coolant aromatically.

12. A method for adjusting the ambient temperature using a portable mister, comprising:
    a. providing a portable housing for fully containing a cooling agent, and for providing the cooling agent to an irrigation tubing, the portable housing operable to fully contain the cooling agent therein, pumping the cooling agent into the irrigation tubing with a pump, and stopping the pump when a predetermined level of the cooling agent is present in the portable housing.

13. A method of claim 12, comprising providing a fragrance to the cooling agent, the fragrance being mixed with the cooling agent in the portable housing prior to dispersion from the irrigation tubing.

14. A method of claim 12, wherein the portable housing includes a first compartment for compactly storing the irrigation tubing.

* * * * *